United States Patent
Lei

(10) Patent No.: US 9,496,728 B2
(45) Date of Patent: Nov. 15, 2016

(54) PORTABLE BACKUP CHARGER

(71) Applicant: SHENZHEN CARKU TECHNOLOGY CO., LTD., Shenzhen (CN)

(72) Inventor: Xingliang Lei, Shenzhen (CN)

(73) Assignee: SHENZHEN CARKU TECHNOLOGY CO., LTD., Shenzhen (CN)

( * ) Notice: Subject to any disclaimer, the term of this patent is extended or adjusted under 35 U.S.C. 154(b) by 400 days.

(21) Appl. No.: 14/298,986

(22) Filed: Jun. 9, 2014

(65) Prior Publication Data

US 2014/0285009 A1 Sep. 25, 2014

Related U.S. Application Data

(63) Continuation-in-part of application No. PCT/CN2012/083793, filed on Oct. 31, 2012.

(30) Foreign Application Priority Data

Dec. 9, 2011 (CN) .......................... 2011 1 0409190

(51) Int. Cl.
*H02J 7/00* (2006.01)
*H02J 9/06* (2006.01)
*H05B 33/08* (2006.01)

(52) U.S. Cl.
CPC ............ *H02J 7/0026* (2013.01); *H02J 7/0021* (2013.01); *H02J 9/061* (2013.01); *H05B 33/0815* (2013.01); *Y02B 20/341* (2013.01); *Y10T 307/352* (2015.04)

(58) Field of Classification Search
CPC ....................................................... H02J 7/0026
USPC ............................................................ 307/24
See application file for complete search history.

(56) References Cited

FOREIGN PATENT DOCUMENTS

| CN | 2663229 Y | 12/2004 |
| CN | 2814128 Y | 9/2006 |
| CN | 101685974 A | 3/2010 |
| CN | 101685984 A | 3/2010 |
| CN | 201518341 U | 6/2010 |
| CN | 201766385 U | 3/2011 |
| CN | 201947042 U | 8/2011 |
| CN | 202068208 U | 12/2011 |
| CN | 102496985 A | 6/2012 |
| CN | 202333918 U | 7/2012 |
| EP | 0 624 944 A2 | 11/1994 |
| JP | 2010-263733 A | 11/2010 |

*Primary Examiner* — Robert Deberadinis
(74) *Attorney, Agent, or Firm* — Matthias Scholl, PC; Matthias Scholl

(57) ABSTRACT

A portable backup charger includes a set of batteries; a charging circuit; a charge-discharge protection circuit; multiple DC-DC voltage adjusting circuits including a DC-DC 19 V-output boost circuit, a 12 V output circuit, and a DC-DC 5 V-output buck circuit; a MCU circuit; a 12 V output circuit outputting a current in the range of 100 A to 400 A; and a 150 A-250 A fuse. The set of batteries is composed of lithium iron phosphate batteries and lithium cobalt oxide batteries. The 12 V output circuit outputting a current in the range of 100 A to 400 A is directly connected to the set of batteries without interference with the charge-discharge protection circuit. The charger is convenient for carrying, and is capable of providing power for different electrical instruments including for an automobile.

7 Claims, 5 Drawing Sheets

PORTABLE BACKUP CHARGER

CROSS-REFERENCE TO RELATED APPLICATIONS

This application is a continuation-in-part of International Patent Application No. PCT/CN2012/083793 with an international filing date of Oct. 31, 2012, designating the United States, now pending, and further claims priority benefits to Chinese Patent Application No. 201110409190.9 filed Dec. 9, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a DC power supply, and particularly to a portable backup charger for supplying direct current to various types of devices.

2. Description of the Related Art

Mobile power supplies for mobile devices are known but usually suffer from current and voltage limitations.

SUMMARY OF THE INVENTION

In view of the above described problem, it is one objective of the invention to provide a portable backup charger which is able to provide DC-current outputs in various-level voltages, and is able to output a large current source as the start-up source of the automobile.

To achieve the above objectives, the present invention provides a portable backup charger which has the function of self-charging, is able to provide DC-current outputs in various-level voltages, and is able to output a large current source as the start-up source of the automobile.

According to one aspect of the present invention, there is provided a portable backup charger. The portable backup charger comprises a set of batteries; a charging circuit connected to an input end of the set of batteries for charging the set of batteries; a charge-discharge protection circuit connected to the two ends of the set of batteries for protecting the set of batteries in the process of charging or discharging; multiple DC-DC voltage adjusting circuits comprising a DC-DC 19 V-output boost circuit, a 12 V output circuit, and a DC-DC 5 V-output buck circuit; a MCU circuit; a 12 V output circuit outputting a current in the range of 100 A to 400 A; and a 150 A-250 A fuse. The input ends of the multiple DC-DC voltage adjusting circuits are connected in parallel to the connecting point between the output end of the set of batteries and one end of the charge-discharge protection circuit. One end of the 150 A-250 A fuse is connected to the set of batteries, and the other end is connected to the 12 V output circuit outputting a current in the range of 100 A to 400 A. The MCU circuit is connected to the output ends of the multiple DC-DC voltage adjusting circuits, respectively. The set of batteries is composed of lithium iron phosphate batteries and lithium cobalt oxide batteries.

In a class of the embodiment, the portable backup charger further comprises a LED drive circuit and a LED light. The input end of the LED drive circuit is connected to the output end of the set of batteries. The LED light is connected to the output end of the LED drive circuit.

In a class of the embodiment, the portable backup charger further comprises an intelligent LED battery indicator. The intelligent LED battery indicator is connected to the MCU circuit for indicating the power storage of the set of batteries.

In a class of the embodiment, the 12 V output circuit outputting a current in the range of 100 A to 400 A is connected to the two ends of the set of batteries directly without passing the charging-discharging protection circuit.

In a class of the embodiment, the output terminals of the 12 V output circuit outputting a current in the range of 100 A to 400 A adopt a reverse connection-proof plug, and the external positive and negative connecting wires for the output terminals are two silica-gel wires indifferent lengths.

In a class of the embodiment, the 150 A-250 A fuse is connected to positive external connecting wire or the negative external connecting wire.

In a class of the embodiment, the lithium iron phosphate battery or lithium cobalt oxide battery is capable of outputting a high power, and the charge-discharge rate of the battery is 20 c-70 c.

The advantages of the present invention include: (1) since the set of batteries is composed of lithium iron phosphate batteries or lithium cobalt oxide batteries that possesses the characteristics of light weight, small volume, durability, high instantaneous current, and high repeatability in charging, the portable backup charger is capable of providing large start-up current for an automobile; (2) since multiple DC-DC voltage adjusting circuits outputting different voltages are connected to the set of batteries, by controlling the MCU circuit, the portable backup charger is able to supply power for different types of electrical instruments including cellphone, computer, and digital camera; (3) since the portable backup charger comprises a LED drive circuit and a LED light, it is able to provide outdoor light. Therefore, the portable backup charger of the present invention has multiple functions, is convenient for carrying, and is capable of providing power for different electrical instruments in living, touring, or travelling.

1. a set of batteries; 2. a charging circuit; 3. a LED drive circuit; 4. a DC-DC 19 V-output boost circuit; 5. a 12 V output circuit; 6. a DC-DC 5 V-output buck circuit; 7. a MCU circuit; 8. a intelligent LED battery indicator; 9. a 12 V output circuit outputting a current in the range of 100 A to 400 A; 10. a LED light; and 11. a charge-discharge protection circuit.

DETAILED DESCRIPTION OF THE EMBODIMENTS

Exemplary embodiments of the present invention will be described below.

Figure 1:
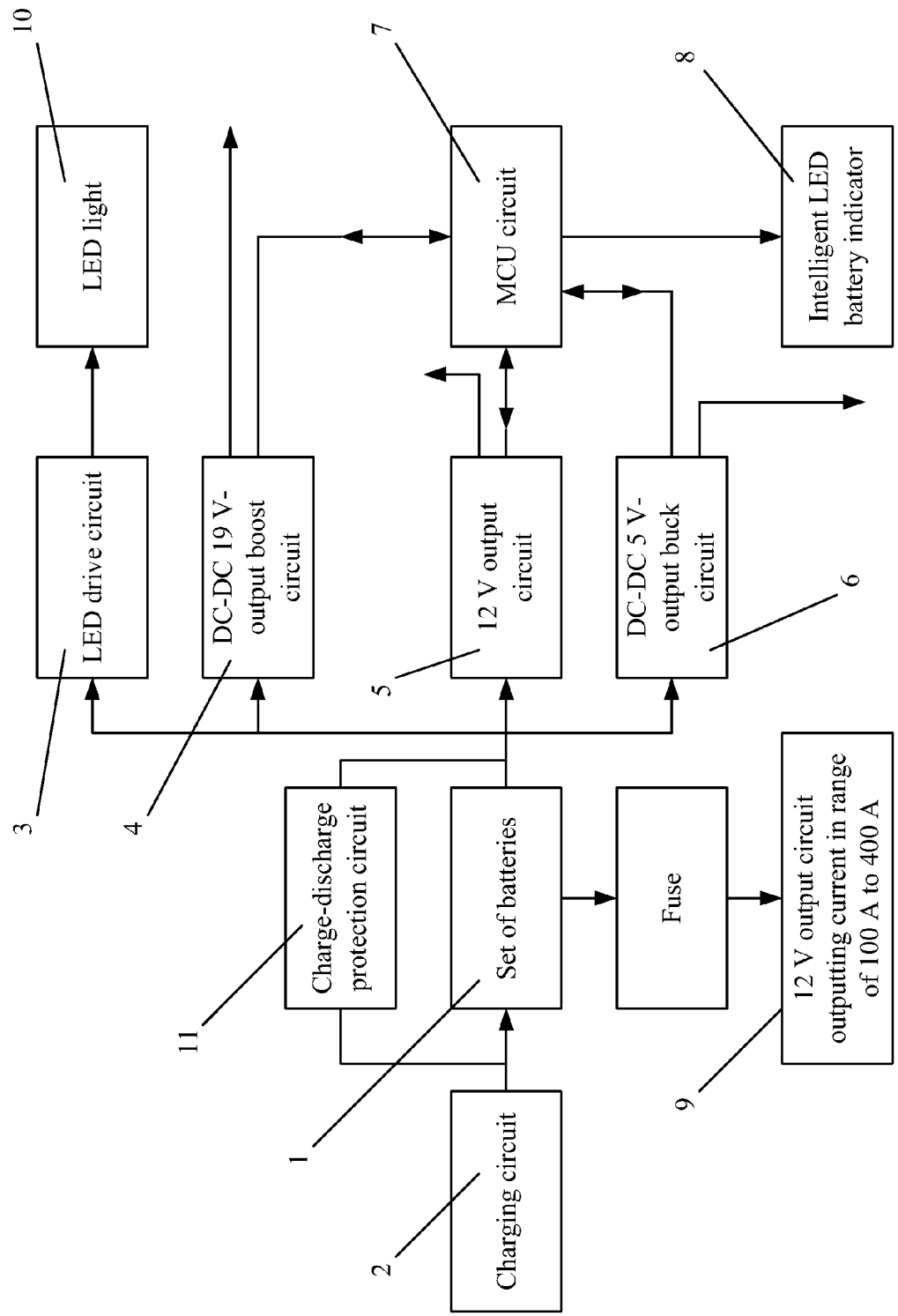
FIG. 1 is a schematic block diagram of the portable backup charge in accordance with one embodiment of the invention.
Figure 2:
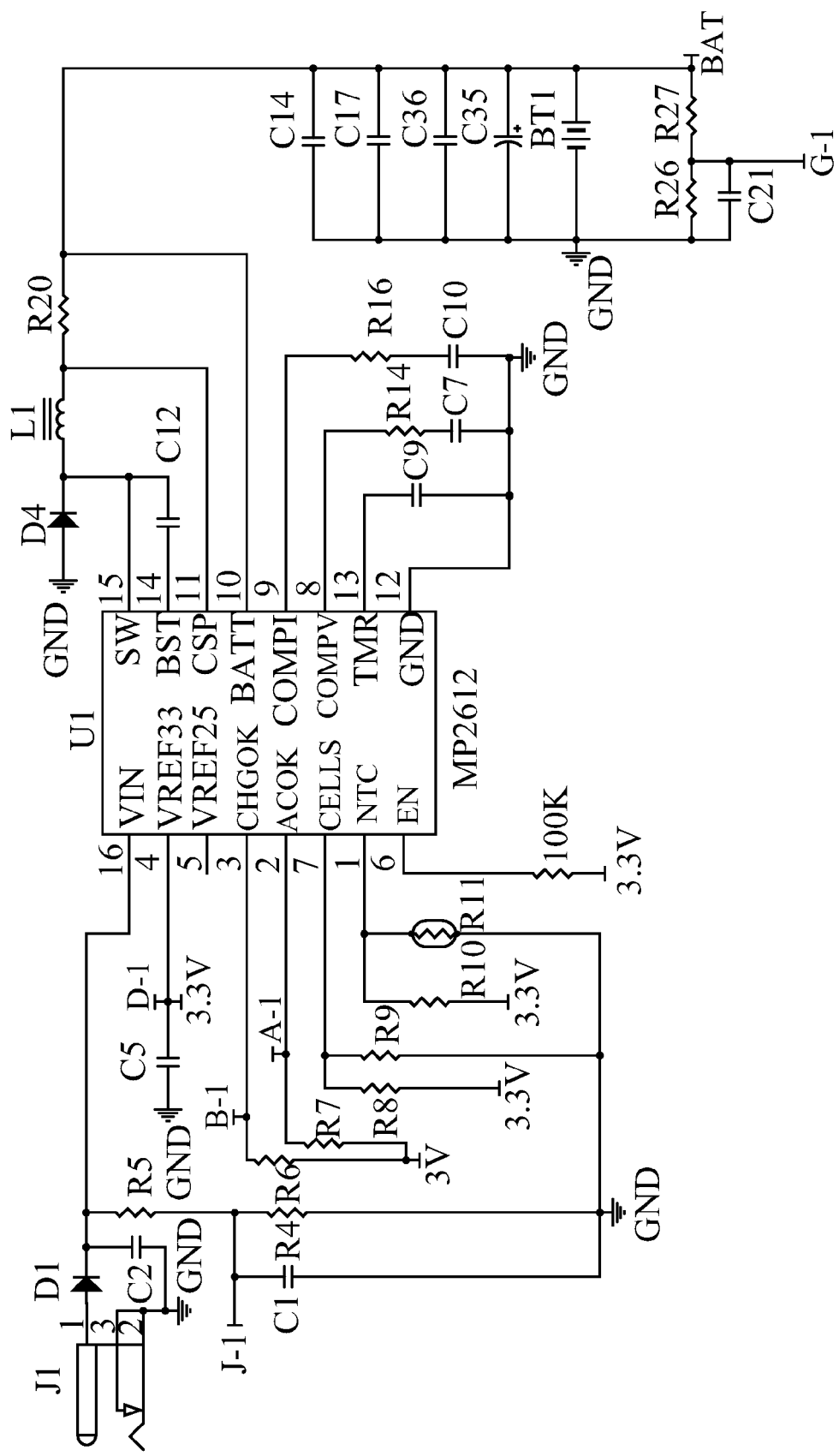
FIG. 2 is a circuit diagram 1-1 of the portable backup charge in accordance with one embodiment of the invention.
Figure 3:
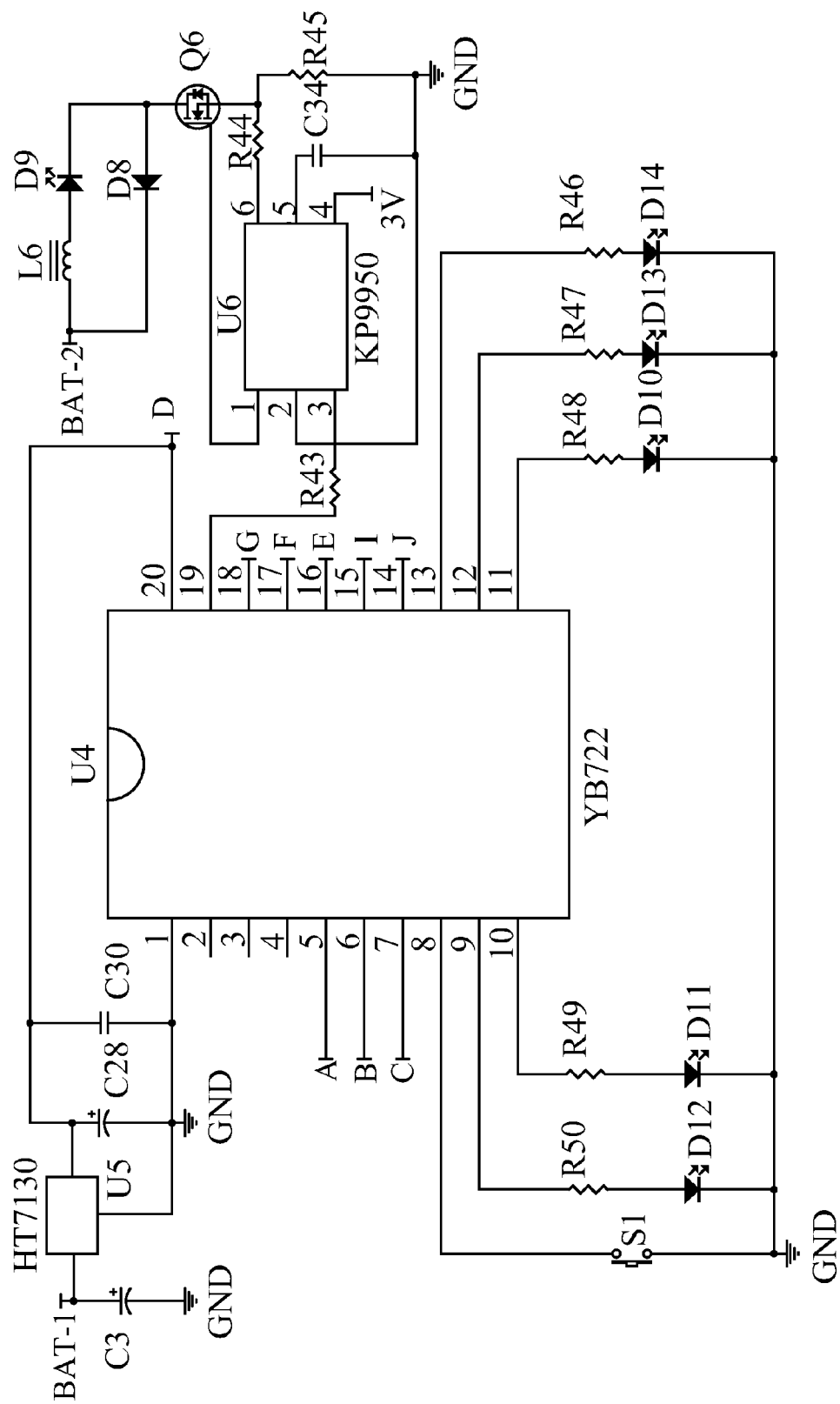
FIG. 3 is a circuit diagram 1-2 of the portable backup charge in accordance with one embodiment of the invention.
Figure 4:
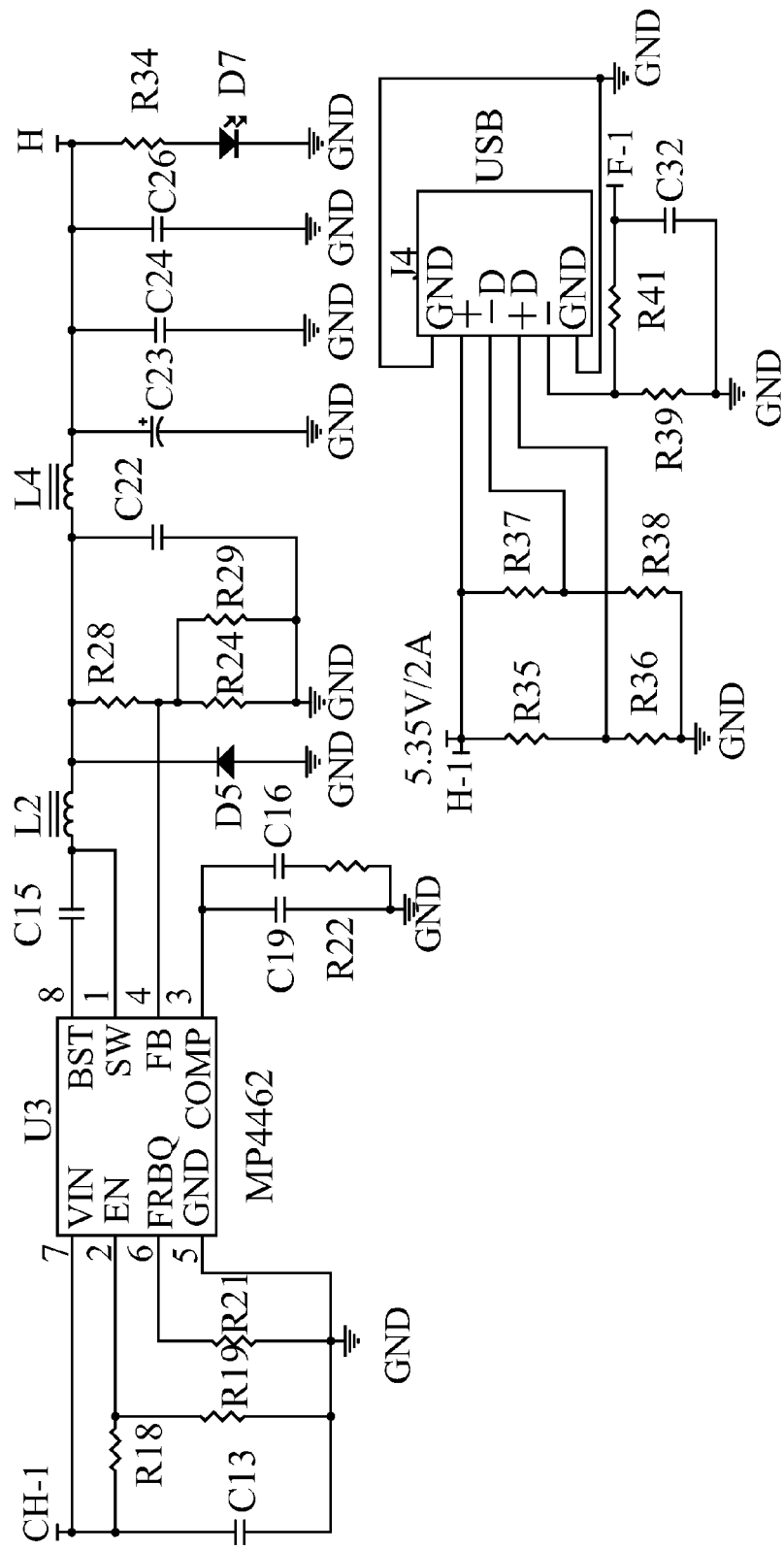
FIG. 4 is a circuit diagram 1-3 of the portable backup charge in accordance with one embodiment of the invention.
Figure 5:
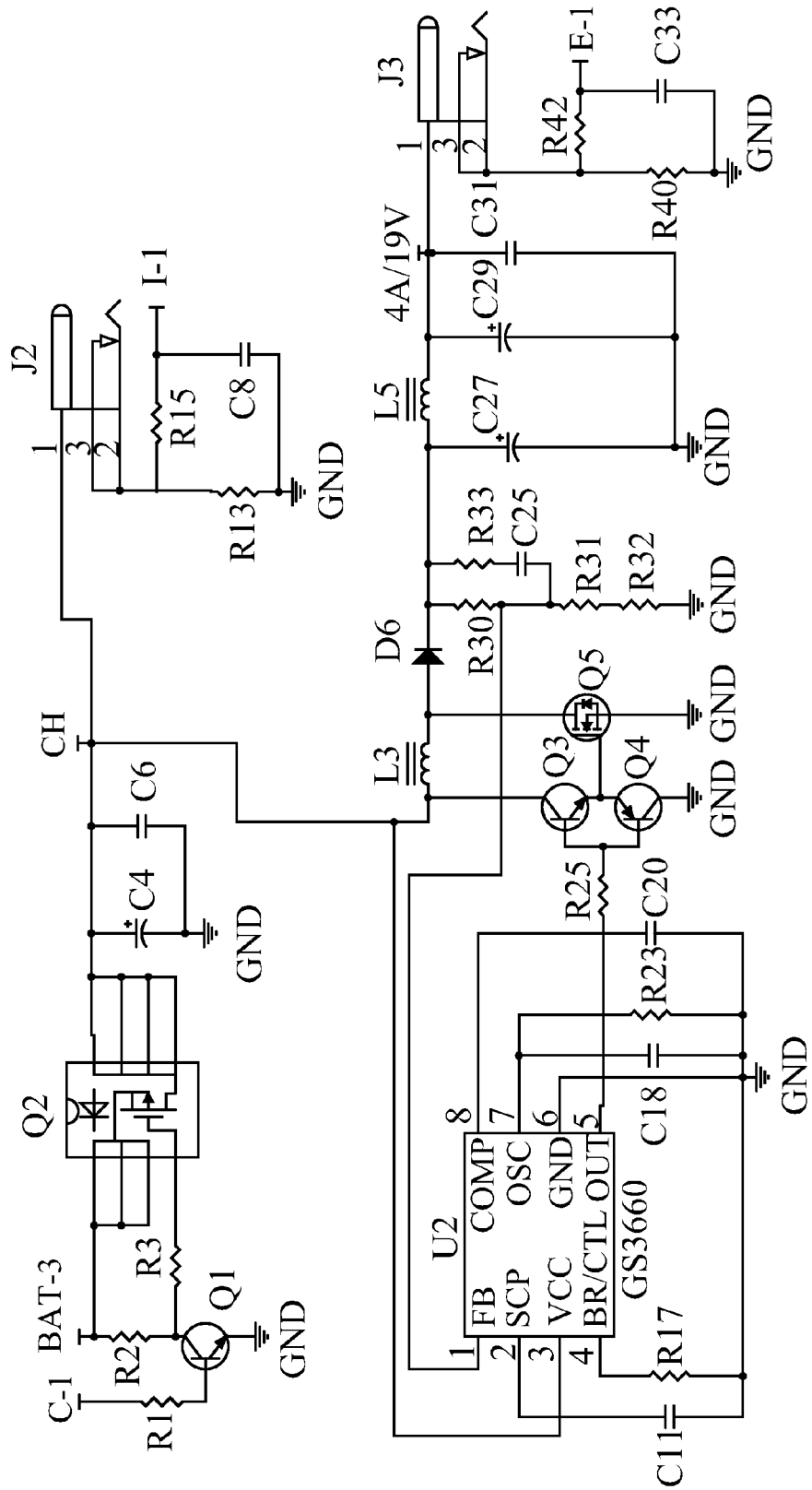
FIG. 5 is a circuit diagram 1-4 of the portable backup charge in accordance with one embodiment of the invention.

As shown in FIG. 1, the set of batteries is connected to multiple DC-DC voltage adjusting circuits including a DC-DC 19 V-output boost circuit 4, a 12 V output circuit 5, and a DC-DC 5 V-output buck circuit 6. Each of the multiple DC-DC voltage adjusting circuits is connected to a MCU circuit 7. By controlling the MCU circuit 7, the user can flexibly choose a particular output voltage for the charger (19 V, 12 V, or 5 V) to supply current source for a particular instrument (a cellphone, a computer, a digital camera, and etc.). Furthermore, by observing the intelligent LED battery indicator 8 which is connected to the MCU circuit 7, the power storage of the set of batteries 1 is known.

Because the charger of the present invention adopts lithium iron phosphate batteries or lithium cobalt oxide batteries to constitute an energy storage element, the charger possesses the characteristics of light weight, small volume, durability, high instantaneous current, and high repeatability in charging. In addition, since the input of the set of batteries 1 is connected to the output of a charging circuit 2, the charger is capable of self-charging. In addition, since the set of batteries 1 is connected to a 12 V output circuit outputting a current in the range of 100 A to 400 A 9, the charger can output a 100-400 A current source under a 12 V voltage and can be a start-up current source for an automobile in emergency. The 12 V output circuit outputting a current in the range of 100 A to 400 A 9 is directly connected to the two ends of the set of batteries without interference with the charging-discharging protection circuit. For the purpose of avoiding overheating the batteries by the short circuit between the positive clamp and the negative clamp or by the reverse connection in the emergent start-up process of an automobile, a 150 A-250 A fuse is connected between the set of batteries 1 and the 12 V output circuit outputting a current in the range of 100 A to 400 A 9. The output terminals of the 12 V output circuit outputting a current in the range of 100 A to 400 A 9 are connected to a reverse connection-proof plug, the external positive and negative connecting wires are silica-gel wires in different lengths.

For the purpose of ensuring safety in the process of charging or discharging the set of batteries 1, a charge-discharge protection circuit 11 is connected to the set of batteries 1 for overcurrent or overload protection.

For the purpose of supplying outdoor light, a LED drive circuit 3 and a LED light 10 are connected successively to the set of batteries 1. Therefore, the charger of the invention is able to be used as an outdoor light.

The circuits of the charger are shown in FIGS. 2-5.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A portable backup charger, comprising:
   a set of batteries;
   a charging circuit connected to an input end of the set of batteries for charging the set of batteries;
   a charge-discharge protection circuit connected to the two ends of the set of batteries for protecting the set of batteries in the process of charging or discharging;
   multiple DC-DC voltage adjusting circuits comprising a DC-DC 19 V-output boost circuit, a 12 V output circuit, and a DC-DC 5 V-output buck circuit;
   a MCU circuit;
   a 12 V output circuit outputting a current in the range of 100 A to 400 A;
   and a 150 A-250 A fuse;
   wherein:
      said charging circuit is connected to the input end of said set of batteries for charging said set of batteries;
      said charge-discharge protection circuit is connected to the two ends of said set of batteries for protecting said set of batteries in the process of charging or discharging;
      the input ends of said multiple DC-DC voltage adjusting circuits are connected in parallel to the connecting point between the output end of said set of batteries and one end of said charge-discharge protection circuit;
      one end of said 150 A-250 A fuse is connected to said set of batteries, and the other end of said 150 A-250 A fuse is connected to said 12 V output circuit outputting a current in the range of 100 A to 400 A;
      said MCU circuit is connected to the output ends of said multiple DC-DC voltage adjusting circuits, respectively;
      said set of batteries is composed of lithium iron phosphate batteries and lithium cobalt oxide batteries.

2. The charger of claim 1, wherein said 12 V output circuit outputting a current in the range of 100 A to 400 A is directly connected to two ends of said set of batteries without interference with said charging-discharging protection circuit.

3. The charger of claim 1, wherein the charger further comprises a LED drive circuit and a LED light; the input end of said LED drive circuit is connected to the connecting point between the output end of said set of batteries and an end of said charge-discharge protection circuit; and said LED light is connected to the output end of said LED drive circuit.

4. The charger of claim 1, wherein the charger further comprises a LED battery indicator; said LED battery indicator is connected to said MCU circuit for indicating power storage of said set of batteries.

5. The charger of claim 1, wherein the output terminals of said 12 V output circuit outputting a current in the range of 100 A to 400 A adopt a reverse connection-proof plug, and the external positive and negative connecting wires for the output terminals are two silica-gel wires in different lengths.

6. The charger of claim 5, wherein said 150 A-250 A fuse is connected to the positive external connecting wire or the negative external connecting wire.

7. The charger of claim 1, wherein the charge-discharge rates of the batteries are in a range of 20 c-70 c.

* * * * *